United States Patent Office 3,347,888
Patented Oct. 17, 1967

3,347,888
CYCLOPROPYL TIN COMPOUNDS
Dietmar Seyferth, Arlington, Mass., assignor to The Dow Chemical Company, Midland, Mich., a corporation of Delaware
No Drawing. Filed May 27, 1963, Ser. No. 283,586
12 Claims. (Cl. 260—429.7)

The present invention is concerned with cycloalkyl tin compounds and is particularly directed to a cyclopropyl tin compound having the formula

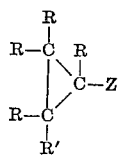

wherein each R independently represents a member selected from the group consisting of hydrogen and methyl;
each R' independently represents a member selected from the group consisting of hydrogen and loweralkyl having from 1 to 4, inclusive, carbon atoms; and
Z represents a radical selected from the group consisting of

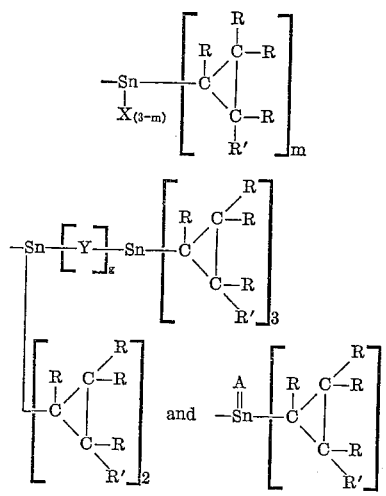

wherein R and R' in each of the radicals are as hereinbefore defined;
$m$ is an integer of from 0 to 3, inclusive;
each X is independently selected from the group consisting of alkyl, alkenyl, alkynyl, phenyl, substituted phenyl wherein substituents are selected from the group consisting of halogen and loweralkyl having from 1 to 4, inclusive, carbon atoms, alkanoate, alkoxy, hydroxy, hydrogen, and groups derived by the removal of at least one hydrogen atom from a mineral acid having a dissociation constant in water, expressed as a $pK_A$ value, of less than 11.0;
Y is a bivalent linking radical selected from the group consisting of —O—, —S—, and hydrocarbonylene being of from 1 to 12 carbon atoms, inclusive;
$g$ is an integer selected from the group consisting of 0 and 1;
and A is a divalent radical selected from the group consisting of oxygen, sulfur, and cyclic dicarboxylate of a dicarboxylic acid having from 2 to 3, inclusive, carbon atoms.

The compounds of the present invention are liquid or crystalline solid materials at ordinary temperatures. These compounds are useful as pesticides and are adapted to be employed as active toxicants of compositions useful for the control of arachnid, helminth, insect, bacterial, algal, and fungal organisms, such as aphids, beetles, ticks, worms, ascarids, and various chordate, anthropod, and mollusk aquatic animal organisms. The compounds are also useful as herbicides for the control of a number of undesirable plant species, and as rodenticides.

In the present specification and claims, X can be, for example, methyl, ethyl, n-propyl, isopropyl, tert-butyl, n-heptyl, and other alkyl groups; alkenyl, such as, for example, vinyl, propenyl, n-but-2-enyl, n-hexenyl, allyl, n-octenyl, isopropenyl; alkynyl, such as propynyl, 4-pentynyl, ethynyl; phenyl and substituted phenyl such as, for example, tolyl, cresyl, xylyl, dichlorophenyl, and the like; alkanoate such as formate, acetate, propionate, butyrate, isobutyrate, 2,2-diethylvalerate, octanoate, pelargonate, dodecanoate, oleate, laurate, and stearate; alkoxy, such as methoxy, n-butoxy, isopropoxy, and n-heptyloxy; bromide, chloride, fluoride, iodide, nitrate, nitrite, phosphate, thiocyanate, cyanate, isocyanate, other groups derived by the removal of hydrogen from mineral acids, and ions of partially ionized polyvalent acids, such as for example, hydrogen sulfate (bisulfate), and dihydrogen phosphate.

The nucleus group having the formula

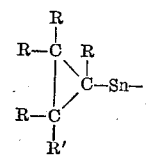

is the essential and common characteristic of the compounds of the present invention. This group is the active group in the compounds and determines the function and characteristic properties of the compounds as manifest in all of the various processes in which they are involved. The choice of X generally has little effect upon the useful properties of the present compounds, although the choice usually has an effect upon the solubility of the compound resulting therefrom. However, because the starting materials available commercially are customarily compounds wherein tetravalent tin is bonded to a plurality of the same radical, X generally will be the same in each of its occurrences in any given compound.

In the present specification and claims, the terms alkyl, alkenyl, alkynyl, and alkoxy are used to refer to radicals being of from 1 to 8, inclusive, carbon atoms, and the term alkanoate, to radicals being of from 1 to 18, inclusive, carbon atoms. As employed in the present specification and claims, the term loweralkyl is employed to refer to radicals being of from 1 to 4, inclusive, carbon atoms. The terms alkyl, loweralkyl, alkenyl, and alkynyl, as employed in the present specification and claims, are used to identify linear and branched linear radicals only and to exclude cyclic radicals such as, for example, cycloalkyl, cycloloweralkyl, and cycloalkenyl. The term halogen as employed in the present specification and claims, refers to bromine and chlorine only.

The hydrocarbonylene bivalent linking radical can be alkylene of 1 to 12, inclusive, carbon atoms, such as, for example, methylene, ethylene, isopropylene, hexamethylene, dimethylethylene, decamethylene, and dodecamethylene; alkenylene of 2 to 12, inclusive, carbon atoms, such as, for example, vinylene, butenylene, and 5-decenylene; butadienylene; tetraphenylbutadieneylene; phenylene and substituted phenylene wherein any substituents are selected from loweralkyl and halogen, such as dimethylphenylene, tetrabromophenylene, and dichlorodimethylphenylene; biphenylene; and naphthylene.

The present product compounds are all prepared by various known procedures. For example, a reactive organometallic compound, such as cyclopropyl or substituted cyclopropylmagnesium bromide (Grignard reagent) or cyclopropyl or substituted cyclopropyllithium, is reacted with a tetravalent tin compound wherein at least one of the valences is satisfied by a chlorine, bromine, or iodine atom, and all other valences of the tin are satisfied by alkyl, alkenyl, alkynyl, phenyl or substituted phenyl radicals. Thus, compounds of the formula

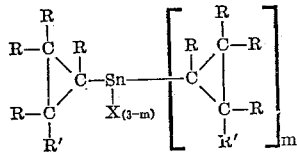

wherein $m$, $R$, and $R'$ are as hereinbefore defined and wherein X is alkyl, alkenyl, alkynyl, phenyl, or substituted phenyl, are conveniently prepared in this manner.

Where the reactive organometallic compound employed is cyclopropyl or substituted cyclopropylmagnesium bromide, the reaction is conducted according to the same procedures as have been employed for the synthesis of di-n-butyldicyclopropyltin and cyclopropyltriphenyltin. See Inorganic Chemistry, volume 1, page 916. The procedure for the di-n-butyldicyclopropyltin is preferred when the desired product is a liquid, the procedure for cyclopropyltriphenyltin, when the desired product is a solid.

In an alternative and preferred manner of conducting the synthesis, the procedures in the above reference are followed except that the reactive organometallic compound employed is cyclopropyl or substituted cyclopropyllithium.

Compounds prepared according to the said synthesis can be employed as starting materials to prepare the remainder of the compounds of the present invention in various known procedures. These procedures are well described in "Organotin Compounds," Chemical Reviews, volume 60, pages 459 to 539, and the references cited there. For example, where X is alkanoate, see pages 494 and pages 498 to 502, inclusive, Section D, 2, (e), Table 18, and references there cited; where X is alkoxy, see pages 494 to 498, inclusive, Section D, 2, (d), Table 17, and references there cited; where X is hydroxy, and where A=O, see pages 491 to 493, inclusive, Section D, 2, (a), Tables 14 and 15, and references there cited; where X is hydrogen, see pages 507, 510, Section E, 2, Table 22, and references there cited; and where X is a group derived by the removal of one or more hydrogen atoms from mineral acids having a dissociation constant in water, expressed as a pKa value, of less than 11.0, see pages 478 to 489, inclusive, Section C, 2, Tables 7 to 12, inclusive, and references there cited, and page 502, Section D, 2, (h), and references there cited.

For the preparation of compounds of the formula

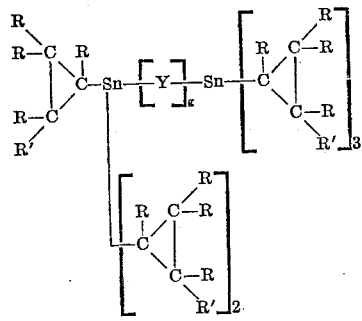

see page 479, Table 6; pages 514 to 516, inclusive, Section G, 2; and Tables 14 and 16 and the accompanying text. Where $A=S$, see Table 16, and where A represents a dicarboxylate, see Table 18 and accompanying text. Available methods are taught also in other references on the preparation of organotin compounds, such as Organo-Metallic Compounds by G. E. Coates (John Wiley and Sons, Inc., New York, 1960), pages 177 to 201, inclusive. In view of the teachings of the references, skilled chemists will be able to make any minor changes that are advantageous to effect the synthesis of all the present compounds.

Compounds of the formula

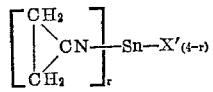

wherein $X'$ represents halogen and $r$ represents an integer of from 1 to 3, inclusive, have been found to possess special advantages when employed for the useful properties of the present invention. These, each of which is a cyclopropyltin halide, including monocyclopropyltin trihalides, dicyclopropyltin dihalides, and cyclopropyltin trihalides, constitute a preferred embodiment of the present invention.

The preferred groups derived by the removal of at least one hydrogen from a mineral acid are those which are derived by the removal of hydrogen from monohydrogen containing mineral acids, i.e., mineral acids of which the cation is monovalent.

The following examples illustrate the invention but are not to be construed as limiting.

*Example 1.—Tetracyclopropyltin*

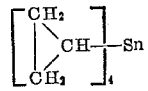

In the preparation of tetracyclopropyltin, cyclopropylmagnesium bromide was reacted together with tin tetrachloride. More particularly, 3.2 grams (0.13 gram atom) of magnesium turnings and 15.0 grams (0.12 mole) of cyclopropyl bromide were reacted together in 80 milliliters of tetrahydrofuran, in standard procedures. The resulting mixture was heated to a temperature of about 65° C. for one hour to obtain a concentrated cyclopropylmagnesium bromide solution. To this solution was added 13.0 grams (0.05 mole) of tin tetrachloride in 30 milliliters of tetrahydrofuran. Thereafter the resulting reaction mixture was heated to a temperature of about 65° C. for a period of twenty-two hours, with stirring; cooled; and then washed with 20 milliliters of saturated aqueous ammonium chloride solution. The washed reaction mixture was distilled to obtain the tetracyclopropyltin product as a liquid having a refractive index $n$ measured at 25° C. for the D line of sodium light of 1.5202, and boiling at 67–68° C. at 0.3 milliliters of pressure.

*Example 2.—Dicyclopropyltin dichloride*

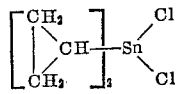

Tetracyclopropyltin was reacted together with tin tetrachloride to obtain dicyclopropyltin dichloride. More particularly, tetracyclopropyltin (4.9 grams; 0.02 mole) was cooled to a temperature of about 0° to 5° C. To the cooled tetracyclopropyltin was added, with continuous cooling, over a period of ten minutes, 2.00 ml. (0.002 mole) of tin tetrachloride (SnCl$_4$). During the addition of the tin tetrachloride, despite cooling, the temperature of the resulting mixture rose briefly to 110° C. The temperature of the resulting mixture was then further raised by heating, over a period of one hour to 200° C. and maintained at a temperature range of 220°–225° C. for four and one-half hours longer.

Thereafter the mixture was subjected to subatmospheric pressure to remove volatile materials and to obtain the dicyclopropyltin dichloride product which was found to boil at 105–106° at 0.1 millimeter pressure. The product crystallized following distillation, was purified by recrystallization from hexane, and was found to melt at 60–60.5° C.

*Example 3.—Bis(tricyclopropyltin) oxide*

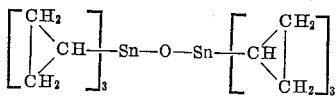

Bis(tricyclopropyltin) oxide was prepared by reacting together tricyclopropyltin bromide and potassium hydroxide. More particularly, tricyclopropyltin bromide (7.0 grams; 0.02 mole), which had been prepared by the reaction of three moles of tetracyclopropyltin and one mole of tin tetrabromide, was mixed with 20 milliliters of diethyl ether to form a first mixture. A second mixture of about 1.5 grams of potassium hydroxide in 8 milliliters of water was added to the first mixture, with agitation. Following the period of agitation, the resulting solution was permitted to stand, whereupon separation of the solution into aqueous and ether layers occurred. The ether layer was separated and washed further with a small amount of aqueous KOH mixture. The washed ether layer was thereafter dried over desiccating material and subjected to subatmospheric pressure to remove therefrom volatile material and to obtain the bis(tricyclopropyltin) oxide as an oily solid.

*Example 4.—Tricyclopropyltin acetate*

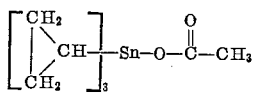

The bis(tricyclopropyltin) oxide of the foregoing example was reacted together with acetic acid to prepare tricyclopropyltin acetate. More particularly, an amount (4.6 grams; 0.01 mole) of the bis(tricyclopropyltin) oxide was mixed in 40 milliliters of ether, and to the resulting mixture was added 1.1 grams (0.02 mole) of glacial acetic acid. The reaction mixture was then filtered to separate the tricyclopropyltin acetate product as a white crystalline material. The product was recrystallized from ether and found to melt at 157.5–158° C.

Other cyclopropyltin compounds are similarly prepared in good yields and in the following manner.

Tricyclopropyltin oleate (molecular weight of 523.4) by reacting together tricyclopropyltin bromide, potassium hydroxide, and oleic acid.

Cyclopropyltrimethyltin (having a refractive index $n$ measured at 25° C. for the D line of sodium light of 1.4720) by reacting together cyclopropylmagnesium bromide and trimethyltin chloride.

Dicyclopropyltin diacrylate (molecular weight of 342.9) by reacting together dicyclopropyltin dibromide and sodium acrylate.

Tricyclopropyl(2,3 - dimethylcyclopropyl)tin (molecular weight of 311.0) by reacting together tricyclopropyltin chloride and (2,3-dimethylcyclopropyl)lithium.

Tricyclopropyltin chloride (having a refractive index $n$ measured at 25° C. for the D line of sodium light of 1.4515, and boiling at 84–85° C. at 0.4 millimeter pressure) by reacting together tetracyclopropyltin and mercuric chloride.

1,4 - naphthylenebis(tricyclopropyltin) (molecular weight of 610.0) by reacting together 1,4-dichloronaphthalene and tricyclopropyltin sodium.

Cyclopropyltriphenyltin (melting at 67–68.5° C.) by reacting together cyclopropylmagnesium bromide and triphenyltin chloride.

Cyclopropyldiethyltin chloride (molecular weight of 253.4) by reacting together dicyclopropyldiethyltin and mercuric chloride.

Dicyclopropyltin dibromide (melting at 53–54° C. and having a bromine content of 44.37 percent as compared to a theoretical bromine content of 44.32 percent) by reacting together tetracyclopropyltin and tin tetrabromide.

Cyclopropyltriisopropyltin (molecular weight of 289.0) by reacting together cyclopropylmagnesium bromide and triisopropyltin chloride.

Tris(2,2-dimethyl-3-n-propyl-1-cyclopropyl) - p - tolyltin (molecular weight of 543.5) by reacting together p-tolyltin trichloride and (2,2-dimethyl - 3 - n-propyl-1-cyclopropyl)magnesium bromide.

Tricyclopropyl-n-butyltin (having a refractive index $n$ measured at 25° C. for the D line of sodium light of 1.5040, and boiling at 84–86° C. at 1.0 millimeter pressure) by reacting together cyclopropylmagnesium bromide and n-butyltin trichloride.

1 2,3,4 - tetraphenyl - 1,3-butadienylenebis-(tris(2,3-dimethyl-1-cyclopropyl)tin) (molecular weight of 1008.0) by reacting together tris(2,3-dimethyl-1-cyclopropyl)tin chloride and 1,4-dilithio-1,2,3,4-tetraphenyl-1,3-butadiene.

Cyclopropyltin trichloride (having a refractive index $n$ measured at 25° C. for the D line of sodium light of 1.5447) by reacting together cyclopropyltriphenyltin and mercuric chloride.

Bis(2-methyl-1-cyclopropyl)-n-butyltin acetate (molecular weight of 345.0) by reacting together bis(2-methyl-1-cyclopropyl)-n-butylvinyltin and glacial acetic acid.

Tricyclopropyl-n-octyltin (molecular weight of 355.1) by reacting together cyclopropylmagnesium bromide and n-octyltin trichloride.

Hexacyclopropylditin (having a refractive index $n$ measured at 25° C. for the D line of sodium light of 1.5627) by reacting together sodium and tricyclopropyltin chloride.

1,10 - decamethylenebis(tricyclopropyltin) (molecular weight of 624.1) by reacting together 1,10-decamethylene-bis(magnesium bromide) and tricyclopropyltin chloride.

Dicyclopropyltin dithiocyanate (melting, with decomposition, at 184–187° C.) by reacting together dicyclopropyltin dichloride and sodium thiocyanate.

Dicyclopropylphenylvinyltin (molecular weight of 305.0) by reacting together dicyclopropylphenyltin chloride and vinylmagnesium bromide.

Tricyclopropylphenyltin (having a refractive index $n$ measured at 25° C. for the D line of sodium light of 1.5604) by reacting together cyclopropylmagnesium bromide and phenyltin trichloride.

n-Hex-2-enyltris(pentamethylcyclopropyl)tin (molecular weight of 535.0) by reacting together n-hex-2-enyllithium and tris(pentamethylcyclopropyl)tin chloride.

Dicyclopropyltin dinitrate (molecular weight of 324.8) by reacting together dicyclopropyltin dibromide and sodium nitrate.

(2,5 - dimethyl-1,4-phenylene)bis(tris(pentamethylcyclopropyl)tin) (molecular weight of 1008.8) by reacting together 1,4-dichloro-2,5-dimethylbenzene with tris(pentamethylcyclopropyl)tin sodium.

Tricyclopropyltin iodide (having a refractive index $n$ measured at 25° C. for the D line of sodium light of 1.5908) by reacting together tricyclopropyltin chloride and sodium iodide.

Bis(2 - isopropyl - 1 - cyclopropyl)tin oxide (molecular weight of 373.0) by reacting together bis(2-isopropyl-1-cyclopropyl)tin dibromide and potassium hydroxide.

Dicyclopropyldi-n-butyltin (having a refractive index $n$ measured at 25° C. for the D line of sodium light of 1.4912) by reacting together cyclopropylmagnesium bromide and di-n-butyltin dichloride.

Tricyclopropyl-n-pent-2-ynyltin (molecular weight of 311.0) by reacting together n-pent-2-ynyllithium and tricyclopropyltin bromide.

Tricyclopropyltin laurate (molecular weight of 409.2) by reacting together tricyclopropyltin bromide, potassium hydroxide, and lauric acid.

Cyclopropyltin tribromide (having a refractive index $n$ measured at 25° C. for the D line of sodium light of 1.6282) by reacting together cyclopropyltriphenyltin and mercuric bromide.

Tert-butoxydicyclopropylethyltin (molecular weight of 303.0) by reacting together dicyclopropylethyltin chloride and tert-butoxymagnesium bromide.

Hexakis(2 - methyl - 1 - cyclopropyl)ditin (molecular weight of 568.0) by reacting together sodium and tris(2-methyl-1-cyclopropyl)tin chloride.

Tricyclopropyltin fluoride (sublimes at 175° at atmospheric pressure) by reacting together tricyclopropyltin iodide and potassium fluoride.

Tris(2-sec-butyl-1-cyclopropyl)-2-propynyltin (molecular weight of 451.3) by reacting together 2-propynyllithium and tris(2-sec-butyl-1-cyclopropyl)tin iodide.

Dicyclopropyltin diiodide (melting at 37.5–38° C.) by reacting together dicyclopropyltin dichloride and sodium iodide.

Tricyclopropyl(2,4 - dichlorophenyl)tin (molecular weight of 387.9) by reacting together cyclopropyllithium and (2,4-dichlorophenyl)tin trichloride.

Methylenebis(tricyclopropyltin) (molecular weight of 497.9) by reacting together tricyclopropyltin sodium and methylene chloride.

Sn,Sn,Sn - Tris(2-ethylcyclopropyl)-Sn′,Sn′,Sn′-tris(2,2,3-trimethylcyclopropyl)ethylenediitin (molecular weight of 722.3) by reacting together tris(2-ethylcyclopropyl)tin hydride and tris(2,2,3-trimethylcyclopropyl)vinyltin.

Dicyclopropyldivinyltin (molecular weight of 254.9) by reacting together divinyltin dichloride and cyclopropylmagnesium bromide.

Cyclopropyl-tri-n-butyltin (having a refractive index $n$ measured at 25° C. for the D line of sodium light of 1.4803) by reacting together cyclopropylmagnesium bromide and tri-n-butyltin chloride.

Dicyclopropyldi-n-hexyltin (molecular weight of 371.1) by reacting together cyclopropylmagnesium bromide and di-n-hexyltin dichloride.

Cyclopropyldimethyltin hydroxide (as a white crystalline material having a molecular weight of 206.9) by reacting together cyclopropyldimethyltin chloride and sodium hydroxide.

Tricyclopropyltin bromide (having a molecular weight of 321.8 and a refractive index $n$ measured at 25° C. for the D line of sodium light of 1.5600) by reacting together tetracyclopropyltin and mercuric bromide.

Tricyclopropyltin octanoate (molecular weight of 403.0) by reacting together dicyclopropyltin dichloride and sodium valerate.

Tricyclopropyltin octanoate (molecular weight of 385.1) by reacting together tricyclopropyltin chloride and sodium octanoate.

Tris(2-n-butyl-1-cyclopropyl)tin stearate (molecular weight of 693.7) by reacting together bis(tris(2-n-butyl-1-cyclopropyltin))oxide and stearic acid.

In employing the new compounds of the present invention as parasiticides or herbicides, the products can be dispersed on a finely divided solid and employed as dusts. Also, such mixtures can be dispersed in water with the aid of a wetting agent and the resulting aqueous suspensions employed as sprays. In other procedures, the products can be employed as constituents of organic liquids, oil-in-water or water-in-oil emulsions or water dispersions with or without the addition of wetting, dispersing or emulsifying agents. In representative operations an aqueous composition containing as sole active toxicant 500 parts of tricyclopropyltin bromide per million parts by weight of ultimate composition gave 100 percent control of Southern armyworms infesting foliage to which the composition was applied as a spray.

The reactive organometallic compounds and the tetravalent tin halide compounds to be employed as starting materials according to the present invention are prepared in known procedures. For example, see "Organotin Compounds" in Chemical Reviews, volume 60, pages 459 to 539, the reference there cited, and Organo-Metallic Compounds by G. E. Coates (published 1960 by John Wiley and Sons, Inc., New York), in particular pages 3 to 21 inclusive, pages 46 to 55 inclusive, and pages 177 to 201 inclusive. With regard to mineral acids having a dissociation constant in water, expressed as a pKa value, of less than 11.0, see An Introduction to General Chemistry (2nd edition, Van Nostrand, New York, 1941, by W. Foster and H. N. Alyea), pages 280 to 283, inclusive.

I claim:
1. A cyclopropyltin compound having the formula

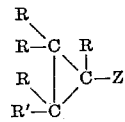

wherein each R independently represents a member selected from the group consisting of hydrogen and methyl;
each R′ independently represents a member selected from the group consisting of hydrogen and loweralkyl having from 1 to 4, inclusive, carbon atoms; and
Z represents a radical selected from the group consisting of

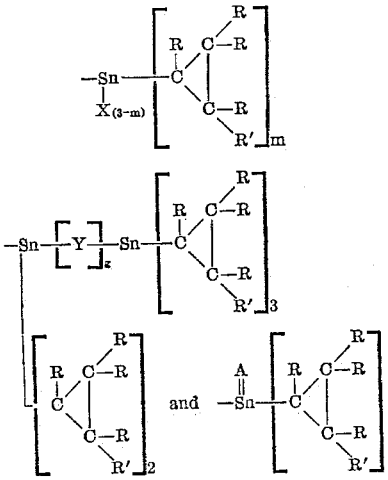

wherein R and R′ in each of the radicals are as hereinbefore defined;
$m$ is an integer of from 0 to 3, inclusive;
each X is independently selected from the group consisting of alkyl, alkenyl, alkynyl, phenyl, substituted phenyl wherein substituents are selected from the group consisting of halogen and loweralkyl having from 1 to 4, inclusive, carbon atoms, alkanoate, alkoxy, hydroxy, hydrogen, thiocyanate;
Y is a bivalent linking radical selected from the group consisting of —O—, —S—, and hydrocarbonylene being of from 1 to 12 carbon atoms, inclusive;
$g$ is an integer selected from the group consisting of 0 and 1;
and A is a divalent radical selected from the group consisting of oxygen, sulfur, and cyclic dicarboxylate of a dicarboxylic acid having from 2 to 3, inclusive, carbon atoms.

2. Tetracyclopropyltin.
3. Cyclopropyltrimethyltin.
4. Tricyclopropyl-n-butyltin.
5. Dicyclopropyldi-n-butyltin.
6. Cyclopropyltri-n-butyltin.
7. Tricyclopropylphenyltin.
8. Cyclopropyltriphenyltin.
9. Tricyclopropyltin acetate.
10. Dicyclopropyltin dithiocyanate.

11. Bis(tricyclopropyltin) oxide.
12. Hexacyclopropylditin.

References Cited

UNITED STATES PATENTS

| | | | |
|---|---|---|---|
| 2,957,785 | 10/1960 | Leatherland | 260—429.7 X |
| 3,067,226 | 12/1962 | Ramsden | 260—429.7 |
| 3,100,215 | 8/1963 | Gelbert et al. | 260—429.7 |
| 3,210,245 | 10/1965 | Merten et al. | 260—429.7 X |

OTHER REFERENCES

Ingham et al., Chemical Reviews, 60, pps. 514–516.
Seyferth et al., Inorganic Chemistry, vol. 1, No. 4, November 1962, pp. 913–916.

TOBIAS E. LEVOW, *Primary Examiner.*

E. C. BARTLETT, W. F. W. BELLAMY,
*Assistant Examiners.*

UNITED STATES PATENT OFFICE
CERTIFICATE OF CORRECTION

Patent No. 3,347,888                                October 17, 1967

Dietmar Seyferth

It is hereby certified that error appears in the above numbered patent requiring correction and that the said Letters Patent should read as corrected below.

Column 4, lines 14 to 17, the formula should appear as shown below instead of as in the patent:

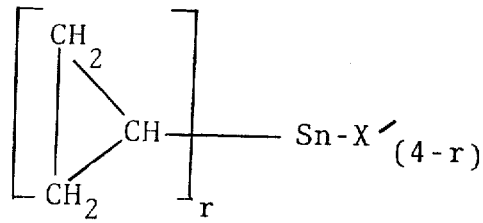

column 6, line 17, for "12,3,4-tetraphenyl" read -- 1,2,3,4-Tetraphenyl --.

Signed and sealed this 3rd day of December 1968.

(SEAL)
Attest:

EDWARD M. FLETCHER, JR.
Attesting Officer

EDWARD J. BRENNER
Commissioner of Patents